United States Patent [19]

Engström et al.

[11] Patent Number: 5,091,166

[45] Date of Patent: Feb. 25, 1992

[54] PROCESS FOR THE PRODUCTION OF CHLORINE DIOXIDE

[75] Inventors: Jörgen Engström, Bergeforsen; Maria Norell, Sundsvall, both of Sweden

[73] Assignee: Eka Nobel AB, Surte, Sweden

[21] Appl. No.: 576,949

[22] Filed: Sep. 4, 1990

[30] Foreign Application Priority Data

Aug. 31, 1990 [SE] Sweden .............................. 9002801

[51] Int. Cl.$^5$ .......................... C01B 11/02; D21C 9/12
[52] U.S. Cl. ........................................ 423/478; 162/6; 162/67
[58] Field of Search ....................... 423/478; 162/6, 67

[56] References Cited

U.S. PATENT DOCUMENTS

| | | | |
|---|---|---|---|
| 2,332,181 | 10/1943 | Sgule ..................................... | 423/478 |
| 2,768,877 | 10/1956 | Williamson et al. ................. | 423/478 |
| 2,833,624 | 5/1958 | Sprauer ................................ | 423/478 |
| 3,563,702 | 2/1971 | Partridge et al. .................... | 423/478 |
| 4,081,520 | 3/1978 | Swindells et al. ................... | 423/478 |
| 4,298,426 | 11/1981 | Torregrossa et al. ................ | 162/67 |

FOREIGN PATENT DOCUMENTS 53-66892 6/1978 Japan .................................. 423/478
63-8203 1/1988 Japan .

OTHER PUBLICATIONS

"Wasserstoffperoxid und seine Derivate, Chemie und Anwendungen", Weigert W. M. (Hrwg.), Heidelberg 1978.

*Primary Examiner*—John Niebling
*Assistant Examiner*—Brian M. Bolam
*Attorney, Agent, or Firm*—Burns, Doane, Swecker & Mathis

[57] ABSTRACT

A process for the production of chlorine dioxide by reacting in a reaction vessel an alkali metal chlorate, mineral acid and a reducing agent in such proportions that chlorine dioxide is produced in a reaction medium which is maintained at a temperature of from about 50° C. to about 100° C. and at an acidity within a range of from about 2 to about 5N. The reaction medium is subjected to subatmospheric pressure sufficient for evaporating water, a mixture of chlorine dioxide, oxygen and water vapor being withdrawn from an evaporation zone in the reaction vessel, and alkali metal sulfate being precipitated in a crystallization zone in the reaction vessel. As the reducing agent hydrogen peroxide is used.

11 Claims, No Drawings

PROCESS FOR THE PRODUCTION OF CHLORINE DIOXIDE

The present invention relates to a process for the production of chlorine dioxide from an alkali metal chlorate, a mineral acid and a reducing agent. More closely the invention relates to production of chlorine dioxide with hydrogen peroxide as the reducing agent. The process is carried out in a vessel operated under subatmospheric pressure, water being evaporated and withdrawn together with chlorine dioxide and oxygen, and the alkali metal salt of the mineral acid being crystallized in the reaction vessel and withdrawn therefrom.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

In existing processes for the production of chlorine dioxide, chlorine gas is often formed as a by-product, due to the use of chloride ions as reducing agent. The basic chemical reaction involved in such processes can be summarized by the formula $$ClO_3^- + Cl^- + 2H^+ \rightarrow ClO_2 + \tfrac{1}{2}Cl_2 + H_2O \qquad [1]$$

The chlorate ions are provided by alkali metal chlorate, preferably sodium chlorate, the chloride ions by alkali metal chloride, preferably sodium chloride, or by hydrogen chloride, and the hydrogen ions are provided by mineral acids, generally sulfuric acid and/or hydrochloric acid.

At the production of chlorine dioxide with chloride ions as the reduction agent according to the formula [1] half a mole of chlorine is produced for each mole of chlorine dioxide. This chlorine gas by-product has previously been used as such in paper mills as bleaching agent in aqueous solution. However, increased environmental demands have resulted in a change-over to pure chlorine dioxide bleaching in industry. To achieve pure chlorine dioxide bleaching there is an increasing demand for chlorine dioxide manufacturing processes which don't produce chlorine as a by-product.

One known way of reducing the chlorine by-product is to use other reducing agents than chloride, reducing agents which don't produce chlorine at the reduction. In the so called "Solvay" process alkali metal chlorate is reduced in an acid medium with methanol as the reducing agent and in the "Mathieson" process the chlorate is reduced with sulphur dioxide in sulphuric acid containing medium. These reducing agents are indirect reducing agents and their reactions are very slow. In U.S. Pat. No. 4,081,520 a more effective "Solvay" process has been obtained by use of a reduced pressure and a high acid normality in a single vessel reactor.

The direct reaction between chlorate ions and methanol or sulphur dioxide is very slow, and the direct reducing agent in these cases are chloride ions reacting according to [1]. The chlorine produced is then reacting with methanol to regenerate chloride ions according to the formula $$CH_3OH + 3Cl_2 + H_2O \rightarrow 6Cl^- + CO_2 + 6H^+ \qquad [2]$$

or with sulphur dioxide according to the formula:

$$Cl_2 + SO_2 + 2H_2O \rightarrow 2HCl + H_2SO_4 \qquad [3]$$

It is therefore often necessary to continuously add a small amount of chloride ions in order to obtain a steady production. Also with methanol and sulphur dioxide as reducing agents a certain amount of chlorine by-product is produced. According to U.S. Pat. No. 4,081,520 operating with methanol as reducing agent, the amount of chlorine by-product produced is decreased with increasing acid normality in the reaction medium. The reaction rate is also increased with increasing acid strength. At a low acid normality the reaction is so slow that it is of no commercial interest. However, the drawback with a high acid strength in the reaction medium is, besides more corrosion in the equipment, the production of an acid salt in the form of sesquisulfate ($Na_3H(SO_4)_2$) or bisulfate ($NaHSO_4$). An acid salt means loss of acid in the production and costs for neutralization of the salt.

It is also known to speed up the reaction rate at low acidities by using catalysts both with chloride and methanol as the reducing agent. U.S. Pat. No. 3,563,702 discloses catalysts for chloride reduction and U.S. patent application Ser. No. 372,469 mentions several catalyst for methanol. However, catalysts are expensive and thus increases the production costs.

Another draw back with methanol as the reducing agent could be the formation of chlorinated organic compounds, from by-products of methanol, in the bleaching train. It is well known that the efficiency of the added methanol is lowered due to side reactions where formaldehyde and formic acid are formed. Also some of the methanol leaves the reactor without having participated in the reduction. The corresponding ether and ester are probably there as well. It could be expected that reactions can occur in the bleaching train with the aldehyde, acid, ether and ester resulting in chlorinated organic compounds.

It is accordingly an object of the present invention to provide a chlorine dioxide process of high efficiency and high production rate wherein little or no chlorine is formed as a by-product and wherein the produced alkali metal sulfate is neutral. It is a further object of the invention to provide a process wherein no other detrimental by-products are formed.

The object of the invention was achieved by a process, as claimed in the claims, for producing chlorine dioxide using a single vessel process with a reduced pressure and using hydrogen peroxide as the reducing agent. The process was run at a low acid normality, between about 2 and about 5N, preferably about 4.8N. It was surprisingly found that with hydrogen peroxide as the reducing agent it is possible to obtain a process with a very high reaction rate and efficiency at low acid normalities without the aid of catalysts.

Hydrogen peroxide is known as a reducing agent in the literature. In "Wasserstoffperoxid und seine Derivative Chemie und Anwendung", Weigert W. M. (Hrsg), Heidelberg, 1978, p. 31–32, hydrogen peroxide is reported as a reducing agent for chlorate in chlorine dioxide production. The advantage is said to be the production of chlorine free chlorine dioxide. However, as a draw back the production of bisulfate ($NaHSO_4$) is mentioned. This means that it has been regarded as necessary to have an acid normality above about 11N in the reaction medium. The following formula is given:

$$2NaClO_3 + 2H_2SO_4 + H_2O_2 \rightarrow 2ClO_2 + 2NaHSO_4 + 2H_2O + O_2$$

Bisulfate is the salt obtained when the acid normality is above 11N.

In the Japanese patent application JP 88-8203 chlorine dioxide production is obtained with an acid strength of 8 to 11N with hydrogen peroxide and chloride as reducing agents.

In the present invention it was found that if the single vessel process with reduced pressure was used together with hydrogen peroxide it was possible to produce essentially chlorine free chlorine dioxide at an acid normality between 2 and 5N and thus produce a neutral salt. The following formula illustrates the reaction:

$$2NaClO_3 + H_2SO_4 + H_2O_2 \rightarrow 2ClO_2 + Na_2SO_4 + 2H_2O + O_2$$

It was found that the reaction rate and the efficiency was very high in the range 2 to about 5N. This is very surprising, as with all other processes, this range is known to be a slow reaction range. With the present invention it was found that the reaction rate in the interval 2 to about 5N, preferably 4.8N exceeded the reaction rate in known process with several hundreds percent.

Thus, with the present invention it was possible to produce chlorine dioxide with high reaction rate without the aid of catalysts in the acidity interval 2 to 5N thereby producing a neutral salt.

Another advantage with hydrogen peroxide as reducing agent for chlorine dioxide production is that the only by-product is oxygen. Besides the by-product being a harmless gas, this oxygen can be used in the paper mills as a bleaching agent together with the chlorine dioxide. It is another preferred embodiment of the present invention to use the chlorine dioxide produced according to the present invention together with all or a part of the formed oxygen in the paper mills as bleaching agents.

The amount of hydrogen peroxide for the reduction of alkali metal chlorate can be from about 0.06 to about 0.6, suitably about 0.16 to about 0.32 ton/ton chlorate, preferably 0.16 to 0.22 ton/ton chlorate.

The chlorate concentration in the reaction vessel can vary within wide limits, from a low concentration of about 0.25M up to saturation, preferably from about 1.5 up to saturation, most preferably from about 2.5M up to saturation.

The production of chlorine dioxide according to the present process is performed in a single reaction vessel, generator—evaporator—crystallizer. A suitable reactor is an SVP® (single vessel process) reactor. The reactants are added continuously to the reactor. The alkali metal chlorate is added in an amount of from 1.58 to 2.0 tone/tone chlorine dioxide and hydrogen peroxide in an amount within the interval as mentioned above. The reaction is suitably operated at a temperature of 50°-100° C., preferably 50°-75° C. and at a pressure below atmospheric pressure, suitably at 60-400 mm Hg. Then the reaction medium boils or water is evaporated in a sufficient amount to dilute the chlorine dioxide formed to a safe concentration. The acidity in the reactor is adjusted by adding a mineral acid, preferably sulfuric acid. In the reactor, the alkali metal salt of the mineral acid is continuously crystallized and separated in a suitable manner. In order to avoid production losses during start and at production changes an addition of a small amount of chloride ions can be appropriate, preferably in the form of alkali metal chloride, so as to maintain the concentration thereof in the reactor within the interval from 0.001 and up to 0.8 moles per liter. Normally conventional, commercially available chlorate (without extra added alkali metal chloride) contains not more than about 0.5, often not more than about 0.05, preferably not more than about 0.02, most preferably not more than about 0.01 weight percent alkali metal chloride.

It is preferred to use this conventional alkali metal chlorate in the process, thus to use chlorate without extra added alkali metal chloride.

However, additional alkali metal chloride can be added if it is necessary to obtain the above mentioned chloride content in the reactor.

The process is not restricted to any of the alkali metals, but sodium is the most preferred.

If suitable it is also possible to add other reducing agents such as methanol, formaldehyde, formic acid, sugar alcohols, sulfur dioxide and chloride. Catalyst such as silver, manganese, vanadium, molybdenum, palladium and platinum can also be added if appropriate.

The invention is illustrated by means of the following examples, where parts and percentages mean parts by weight and percentages by weight, unless otherwise specified.

EXAMPLE 1

To a laboratory chlorine dioxide generator a water solution of 382 g/h NaClO$_3$ was continuously added together with 202 g/h H$_2$O$_2$ of 30% concentration. H$_2$SO$_4$ of 50% concentration was fed in an amount sufficient to keep an acid strength of 4N. 5 g/h NaCl was also added together with the chlorate solution (in this case a chlorate with an extra added amount of chloride was used). The generator was run continuously at a temperature of about 70° C. and the reaction medium was kept at boiling when the absolute pressure was 150 mm Hg, i.e. below atmospheric pressure. A neutral NaSO$_4$ salt was obtained in the crystal region. The chlorine dioxide production was 1.2 kg/l and 24 hr and the yield 99%.

EXAMPLE 2

To a laboratory chlorine dioxide generator a water solution of 161 g/h NaClO$_3$ was continuously added together with 92 g/h H$_2$O$_2$ of 30% concentration. H$_2$SO$_4$ of 50% concentration was fed in an amount sufficient to keep an acid strength of 4N. 0.06 g/h NaCl was also added together with the chlorate solution (emanating from the conventional chlorate without an extra added amount of chloride). The generator was run continuously at a temperature of about 70° C. and the reaction medium was kept at boiling when the absolute pressure was 150 mm Hg, i.e. below atmospheric pressure. A neutral NaSO$_4$ salt was obtained in the crystal region. The chlorine dioxide production was 0.8 kg/l and 24 hr and the yield 98%.

EXAMPLE 3

Another experiment was run in accordance with example 1 but with an absolute pressure of 250 mm Hg. Thus, to a laboratory chlorine dioxide generator a water solution of 337 g/h NaClO$_3$ was continuously added together with 181 g/h H$_2$O$_2$ of 30% concentration. $H_2SO_4$ of 50% concentration was fed in an amount sufficient to keep an acid strength of 4.2N. 4 g/h NaCl was also added together with the chlorate solution (in this case a chlorate with an extra added amount of chloride was used). The generator was run continuously at a temperature of about 80° C. and the reaction medium was kept at boiling. A neutral $NaSO_4$ salt was obtained in the crystal region. The chlorine dioxide production was 1.5 kg/l and 24 hr and the yield was 91%.

We claim:

1. In a process of producing chlorine dioxide by reducing alkali metal chlorate with hydrogen peroxide as the reducing agent in an aqueous reaction medium containing sulfuric acid, said reaction medium maintained in a single reaction vessel under subatmospheric pressure, the process including the steps of maintaining said reaction medium at its boiling point at a temperature of from about 50° C. to about 100° C. to evaporate water from said reaction medium and provide a gaseous mixture containing steam, oxygen and chlorine dioxide;

removing said gaseous mixture from said single reaction vessel, recovering an aqueous solution of chlorine dioxide from said removed mixture;

maintaining substantially steady state conditions in said reaction medium by continuously feeding said alkali metal chlorate, hydrogen peroxide and sulfuric acid into said reaction medium to make up chemicals consumed in said reducing step and to maintain a total acid normality in said reaction medium within the range of from about 2 to about 5N;

maintaining the liquid level in said single reaction vessel substantially constant by balancing water fed to the single reaction vessel with water removed therefrom;

continuously depositing alkali metal sulfate salt from said reaction medium after the reaction medium becomes saturated thereby after the initial start up of the process, and removing said deposited alkali metal salt from said single reaction vessel;

wherein said process is carried out in the absence of a catalyst.

2. A process according to claim 1, wherein the total acid normality in the reaction medium is within the range of from about 2 to about 4.8N.

3. A process according to claim 1, wherein hydrogen peroxide is used in an amount of about 0.06 to about 0.6 ton/ton chlorate.

4. A process according to claim 1, wherein hydrogen peroxide is used in an amount of about 0.16 to about 0.32 ton/ton chlorate.

5. A process according to claim 1, wherein the chlorate concentration is from about 0.25M up to saturation in the reaction vessel.

6. A process according to claim 1, wherein the chlorate concentration is from about 1.5M up to saturation in the reaction vessel.

7. A process according to claim 1, wherein the chlorate concentration is from about 2.5M up to saturation in the reaction vessel.

8. A process according to claim 1, wherein conventional alkali metal chlorate without extra added alkali metal chloride is used.

9. A process according to claim 1, wherein additional alkali metal chloride is added to obtain a concentration of from about 0.001 to about 0.8 moles per liter in the reaction vessel.

10. A process according to claim 1, wherein the alkali metal is sodium.

11. A method for bleaching paper pulp using a blend of chlorine dioxide and oxygen, comprising the steps of:

(a) forming a gaseous mixture of chlorine dioxide, oxygen and steam by reducing alkali metal chlorate with hydrogen peroxide as the reducing agent in an aqueous medium containing sulfuric acid, said reaction medium maintained in a single reaction vessel under subatmospheric pressure and at an acid normality of from about 2N to about 5N, wherein the gaseous mixture of chlorine dioxide, oxygen and steam is formed by the steps of (1) maintaining the reaction medium at its boiling point at a temperature of from about 50° C. to about 100° C. to evaporate water from the reaction medium and to thereby form the gaseous mixture;

(2) removing the gaseous mixture from the single reaction vessel and recovering oxygen and an aqueous solution of chlorine dioxide from said removed mixture;

(3) continuously depositing alkali metal sulfate salt from the reaction medium after the reaction medium becomes saturated thereby, and removing the deposited alkali metal salt from the single reaction vessel; wherein said formation of chlorine dioxide is carried out in the absence of a catalyst; and (b) bleaching the paper pulp with the chlorine dioxide solution and with at least part of the oxygen formed during the reduction of alkali metal chlorate in step (a).

* * * * *